(12) United States Patent
Johnson et al.

(10) Patent No.: US 8,898,799 B2
(45) Date of Patent: Nov. 25, 2014

(54) METHOD AND SYSTEM FOR ESTABLISHING TRUST BETWEEN A SERVICE PROVIDER AND A CLIENT OF THE SERVICE PROVIDER

(71) Applicant: Visa Europe Limited, London (GB)

(72) Inventors: Matthew Johnson, Luton (GB); Malcolm Lewis, Twickenham (GB); Boris Taratine, London (GB)

(73) Assignee: Visa Europe Limited, London (GB)

( * ) Notice: Subject to any disclaimer, the term of this patent is extended or adjusted under 35 U.S.C. 154(b) by 2 days.

(21) Appl. No.: 13/750,780

(22) Filed: Jan. 25, 2013

(65) Prior Publication Data

US 2013/0305050 A1 Nov. 14, 2013

Related U.S. Application Data

(63) Continuation-in-part of application No. 13/467,862, filed on May 9, 2012, now abandoned.

(51) Int. Cl.
*G06F 21/00* (2013.01)
*H04L 9/32* (2006.01)

(52) U.S. Cl.
CPC ........... *H04L 9/3202* (2013.01); *H04L 2209/56* (2013.01); *H04L 9/321* (2013.01); *H04L 9/3215* (2013.01)

USPC .......................................................... 726/26

(58) Field of Classification Search
USPC .......................................................... 726/26
See application file for complete search history.

(56) References Cited

U.S. PATENT DOCUMENTS

| | | |
|---|---|---|
| 2002/0138450 A1 | 9/2002 | Kremer |
| 2002/0165830 A1 | 11/2002 | Kremer |
| 2003/0140252 A1 | 7/2003 | Lafon et al. |
| 2009/0259848 A1 | 10/2009 | Williams et al. |
| 2011/0040965 A1* | 2/2011 | Feezel et al. ................. 713/156 |

* cited by examiner

*Primary Examiner* — Tu Nguyen
(74) *Attorney, Agent, or Firm* — EIP US LLP

(57) ABSTRACT

Trust is established between a service provider (20) and a client (10) of the service provider (20). The client (10) is associated with a party that is known by an identity provider (50), and the identity provider (50) is trusted by the service provider (20). The identity provider (50) contacts (70) the party (80) via a predetermined medium, and requests the party to identify itself. The identity provider (50) determines whether the identity of the identifying party (80) corresponds to an identity held by the identity provider (50) for the party and shares a secret (100) with the identifying party (80) in the event that the identity provider (50) has determined that the identity of the identifying party (80) is the same as said identity held by the identity provider (50).

29 Claims, 7 Drawing Sheets

METHOD AND SYSTEM FOR ESTABLISHING TRUST BETWEEN A SERVICE PROVIDER AND A CLIENT OF THE SERVICE PROVIDER

CROSS-REFERENCE TO RELATED APPLICATIONS

This application is a continuation in part of U.S. patent application Ser. No. 13/467,862, filed May 9, 2012, the contents of which are incorporated by reference herein in their entirety.

BACKGROUND OF THE INVENTION

1. Field of the Invention

The present invention relates to a method and system for establishing trust between a service provider and a client of the service provider.

2. Description of the Related Technology

Identity theft (also known as identity fraud) is a relatively common occurrence in the present day. It is possible, for example, to purchase personal details of another person over the internet, which may be sufficient to gain access to services using that person's identity. Such details may be sufficient, for example, to open up a bank account or claim state benefits in a person's name, or to make payments from a person's bank account etc. As many services are now provided without face-to-face contact (over the internet, for example), it is ever more difficult to spot identity theft.

As a particular example, online merchants who sell products or services from an internet site often provide online payment services. However, many such payment services have minimal security, and it is possible to purchase products and/or services from an online merchant by simply providing credit card details, a name and an address; all of which can be easily bought online. A true account holder, whose details have been stolen and used fraudulently, can repudiate the fraudulent payment, by claiming against the payment, causing an online merchant to lose money if the services/products have already been provided/dispatched. As the range of personal identifiable information that can be bought online increases, more stringent measures need to be taken to verify that a client providing account details for payment to an online merchant is actually authorized to use that account.

There is also a need to establish a level of trust between a service provider and a client of a service provider outside the field of monetary transactions. For example, a client may attempt to enroll a party with a service provider (such as a university, for example), and it may be important that the service provider knows the client is authorized by the party to enroll that party.

A system and method for establishing a level of trust between a service provider (in this case an online merchant) and a client of the service provider is described in US App. Pub. No. 2002/0138450. With this system, the client is an application running on a device used by a user; the client contacts a service provider via a first communication network and provides details that unambiguously identify a party (for example bank account details, which identify an account holder). These details may relate to a party that is the actual owner and authorized user of the device, or, in the case that the details have been stolen, to another party, who is not authorized to use the details. Thus, at this stage, the service provider simply knows that there is an association of sorts between the party using the device and the client application running on the device being used to submit the details. Importantly, the service provider does not trust that the client is authorized to use the submitted details.

In order to verify the association between the party using the device and the client thereon, the service provider sends the details to an identity provider that can validate the identity of the party who submitted the details. Such an identity provider could, for example, be an issuing bank. On the basis of records held by the identity provider for the party corresponding to the submitted details, the identity provider then determines an address of a second device on a second communication network, which it knows to be associated with the party that owns the details submitted via the client, and sends a secret number to that second device.

If the user of the first device is also in possession of the second device, they can receive the secret number on the second device and then supply the secret number to the client so that the secret number can be sent from the first device to the service provider in order to verify the payment. Upon receipt of a secret number, the service provider then sends the secret number to the identity provider so that the identity provider can check whether the number received from the client matches the number sent to the second device. If the numbers match, the identity provider indicates to the service provider that the service provider can trust the client. However, if the numbers do not match, the identity provider indicates to the service provider that the client should not be trusted.

It will be appreciated that, in the case that the user of the first device has both stolen the details of a party and also has access to messages sent to the second device, the user of the device can obtain access to the secret number via the second device and can provide this secret to the client, thus providing the user of the device with access to services provided by the service provider using the personal details of the party who actually owns the submitted details.

SUMMARY

According to a first aspect of the present invention, there is provided a method of establishing trust between a service provider and a client of the service provider, the client being associated with a party known by an identity provider that is trusted by the service provider, the service provider and the identity provider being preconfigured with a first cryptographic protocol for use in configuring a first channel between the identity provider and the service provider, said first channel being configured such that data sent via the first channel is signed by the sender according to the first cryptographic protocol, wherein the identity provider receives data that unambiguously identifies said party from the service provider via the first channel and uses a predetermined medium to contact said party, the method comprising: determining whether said data received via the first channel is authentic according to said first cryptographic protocol; in the event that the data is determined to be authentic: contacting the party via said predetermined medium, whereby to request the party to identify itself to the identity provider; determining, up to a predetermined level of trust, whether the identity of the identifying party corresponds to an identity held by the identity provider for the party; and sharing a first secret with the party via a further channel in the event that the identity provider has determined that the identity of the identifying party is the same as said identity held by the identity provider, said first secret being for use by the client in establishing trust between the client and the service provider.

Thus according to exemplary embodiments described herein, unlike the aforementioned prior art system, the identity provider does not share the first secret with the contacted party straight away. Instead, the identity provider determines, up to a predetermined level of trust, whether the identity of the identifying party corresponds to the identity of the party associated with the client and does not share the first secret with the identifying party if it does not trust that the identifying party is the party associated with the client. This prevents fraudsters who have somehow gained access to the predetermined contact medium (between the identity provider and the party) from retrieving the first secret, and also allows fraudsters to be detected if they are unable to prove to the identity provider that the purported association with the client is valid. Furthermore, as the data sent to the identity provider is signed by the service provider according to the first cryptographic protocol, the identity provider is able to check the authenticity and integrity of the data using the first cryptographic protocol. The identity provider will therefore be able to verify that the received data has not been tampered with or sent fraudulently by a third party and therefore that the received data correctly identifies the party associated with the client.

It will be appreciated that the first secret need not be the same as the second secret for the secrets to correspond to one another.

In exemplary embodiments, the service provider may be an online merchant, which provides access to transaction and payment services, and the client may be a program or application on a device. The client may request a transaction to be made by the online merchant from the account of the party associated with the client. The service provider needs to determine whether to trust that the client is authorized to request a transaction on behalf of the party with which it purports to have an association. The identity provider, in this case, may be an issuing bank with which the associated party holds an account. The issuing bank has access to data identifying a predetermined medium for contacting that party and data that enables the bank to determine, up to a predetermined level of trust, whether an identifying party is the known party.

In one arrangement, in the event that the identity provider verifies that the identity of the identifying party does not correspond to an identity held by the identity provider for the party, then the identity provider indicates to the service provider that verification was unsuccessful.

Further to the above, the identity provider and the service provider may be configured with a second cryptographic protocol for use in configuring a second channel and the method further comprises sharing, via said second channel, a second secret between the identity provider and the service provider for the party, said second channel being configured such that data sent via the second channel is signed by one of the identity provider and the service provider sending the second secret according said second cryptographic protocol. Sharing the second secret via the second channel therefore enables the recipient of the second secret (either the service provider or the identity provider) to check the authenticity and integrity of the second secret. The second cryptographic protocol is preferably also such that data sent on the second channel is encrypted. This ensures that the second secret cannot be "eavesdropped" on by third parties.

Further, in one arrangement, upon receipt of said second secret by a corresponding other one of the identity provider and the service provider, the method includes determining whether said second secret is authentic according to the second cryptographic protocol. As mentioned above, this ensures that any fraudulent secrets sent by third parties will be detected.

The first cryptographic protocol may be the same as the second cryptographic protocol. Preferably both the first and second channels are configured such that data sent via those channels is both signed and encrypted. This prevents data sent on those channels from being eavesdropped and enables to recipient to check the authenticity of the data.

Advantageously, in one arrangement the party is known by a plurality of identity providers, each of which is trusted by the service provider and is preconfigured with respective first and second cryptographic protocols for configuring respective first and second channels and in which, in the event that each said identity provider independently determines that the identity of the identifying party corresponds to the identity of the party, each of said identity providers shares a different first secret with the party via a respective further channel, each said different first secret being for use by the client in establishing trust between the client and the service provider.

In one arrangement, trust is established between the client and the service provider in dependence upon the first secret for each identity provider corresponding to the second secret for that identity provider.

Conveniently, at least one identity provider may send data relating to the party to the service provider, said data being required by the service provider to provide a service to the client and being signed by the identity provider according to the respective first or second cryptographic protocol for that identity provider. The data may optionally also be encrypted. In general, the client will send details identifying the party associated with the client to the service provider, but in this case, the client only needs to send details that are sufficient to identify the party to the identity provider, and does not need to provide all the details that are required by the service provider. Such details may be, for example, the postcode of the party, the first and last digits of the account number of an account held by the party, and the day of birth of the party. This, therefore, reduces the risk that if details sent from the client to the service provider are intercepted, they can be used fraudulently.

Advantageously, for each identity provider, the further channel for sharing said first secret is configured such that data sent via the further channel is signed and encrypted by the identity provider according to a cryptographic protocol pre-agreed with the party. The protocol may have been agreed before or after the identity provider determined that the identity of the identifying party corresponds to an identity held by the identity provider for the party.

In one arrangement, said data that unambiguously identifies the party is sufficient for the party to be identified by the identity provider, but is insufficient for a transaction to be carried out using the data. Therefore, if the data is intercepted, it cannot be used fraudulently.

In the event that the identity provider does not determine that said received data that unambiguously identifies a party that is known by the identity provider is authentic, the identity provider may determine not to trust that said data was sent by the service provider Further, the step of determining whether the identity of the identifying party corresponds to an identity held by the identity provider for the party may be dependent upon the identifying party identifying itself in accordance with a predetermined set of authentication criteria. The authentication criteria may include, for example, requiring that the identifying party identifies itself using a second predetermined medium that has been pre-agreed between the identity provider and the party associated with the client and may additionally/alternatively require that the identifying party can correctly answer a number of questions, the answers to which are only known by the identity provider and the party associated with the client. Further, the authentication criteria may require the identifying party to supply pre-agreed biometric materials or other items/materials uniquely possessed by the party.

According to a second aspect of the present invention, there is provided a method of establishing trust between a service provider and a client of the service provider, the client being associated with a party known by an identity provider that is trusted by the service provider, the service provider and the identity provider being preconfigured with first and second cryptographic protocols for use in configuring respective first and second channels between the service provider and the identity provider, said identity provider using a predetermined medium to contact said party thereby requesting said party to identify itself and, in the event of the identity provider determining up to a predetermined level of trust that the identity of the identifying party corresponds to the identity of said party, said identity provider sharing a first secret with said party, the method comprising: signing data that unambiguously identifies the party associated with the client to the identity provider according to the first cryptographic protocol, whereby to configure the first channel and sending said signed data to the identity provider via the first channel; sharing a second secret with the identity provider via the second channel, said second channel being configured such that data sent via the second channel is signed by one of the identity provider and the service provider sending the shared secret according said second cryptographic protocol; and, responsive to receipt of a secret from the client, determining whether the secret received from the client corresponds to said second secret; and, in the event that the secret received from the client corresponds to said second secret, determining to trust said client.

In this embodiment, the service provider trusts that the identity provider will determine that the contacted party is the party associated with the client before the identity provider will share a first secret with that party. Therefore, if the service provider receives a secret from the client that corresponds to the second secret, then it is highly unlikely that received secret originated from a party other than the identity provider. Thus, the service provider can be confident that the client is authorized by the party associated with the client to request a service on behalf of the party with which the client is associated. In other words, the service provider can trust the association between the client and the associated party (i.e. the party that is associated with the client).

In one arrangement, upon receipt of the second secret by one of the identity provider and the service provider, the method comprises verifying whether said second secret is signed by a corresponding other one of the identity provider and the service provider according to the second cryptographic protocol.

Said association between the client and the party may be dependent upon the service provider receiving data from the client that unambiguously identifies the party, said data being sufficient for the party to be identified, but insufficient for a service to be carried out using the data. In other words, if the details sent by the client are intercepted by a third party, it is unlikely that they will be able to be used fraudulently.

In one arrangement, said client is further associated with a device and, in the event that a secret that corresponds to said second secret is received from the client in association with data that unambiguously identifies a said device, the method further comprises: determining whether the device identified by said data corresponds to said associated device; and, in the event that the device identified by said data corresponds to said associated device, binding the identity of the device to the identity of said party. The client may be associated with a device if the client is an application or program run on that device, or alternatively, the client may be associated with a device that is used by the client. If the service provider binds the identity of the device to a party, and if the client later requests services from the service provider on behalf of the associated party via that device, the service provider may trust that the client is authorized to request services on behalf of the associated party. This may mean that the party associated with the device can easily access services from the service provider using their device without having to prove their identity or go through a specific authentication procedure.

Advantageously, in the event that a message is received from the identity provider indicating that the service provider is unable to verify the identity of the party, access to further services by said device may be denied. This prevents a third party from repeatedly trying to fraudulently use someone's identity or the device.

According to a third aspect of the present invention, there is provided a system for use in establishing trust between a service provider and a client of the service provider, the system comprising: a service provider computing system; and a proxy computing system associated with a proxy acting for the service provider, said proxy being trusted by the service provider and said client being associated with a party that is known by the proxy, said service provider and said proxy being preconfigured with first and second cryptographic protocols for use in configuring first and second channels between the service provider computing system and the proxy computing system, said first channel being configured such that data sent via the first channel is signed by the sender according to said cryptographic protocol, wherein said proxy computing system is configurable to contact said party using a predetermined medium, the service provider computing system being arranged to sign data that unambiguously identifies the party associated with the client to the identity provider according to said first cryptographic protocol and to send said signed data to the proxy computing system via said first channel, wherein, responsive to receipt of data, the proxy computing system is arranged to determine whether said received data is authentic according to the first cryptographic protocol, and, in the event that the data is authenticated, the proxy computing system is further arranged to: contact the party via said predetermined medium, whereby to request the party to identify itself to the proxy computing system; determine, up to a predetermined level of trust, whether the identity of the identifying party corresponds to an identity held by proxy computing system for the party; and responsive to a determination that the identity of the identifying party corresponds to said identity held by the proxy computing system, share a first secret with the party via a further channel, and wherein, responsive to receipt of a secret from the client, the service provider computing system is arranged to determine whether the secret received from the client matches said first secret, and, in the event that the secret received from the client is determined to match the first secret, the service provider computer system is arranged to configure a level of trust in respect of said client for the service provider.

An identity provider used by the service provider can be considered to act as a proxy for the service provider, because the identity provider effectively validates, on behalf of the service provider, the purported association between the client and the party using the client.

Further features and advantages of the invention will become apparent from the following description of preferred embodiments of the invention, given by way of example only, which is made with reference to the accompanying drawings.

DETAILED DESCRIPTION OF THE PREFERRED EMBODIMENT

Figure 1:
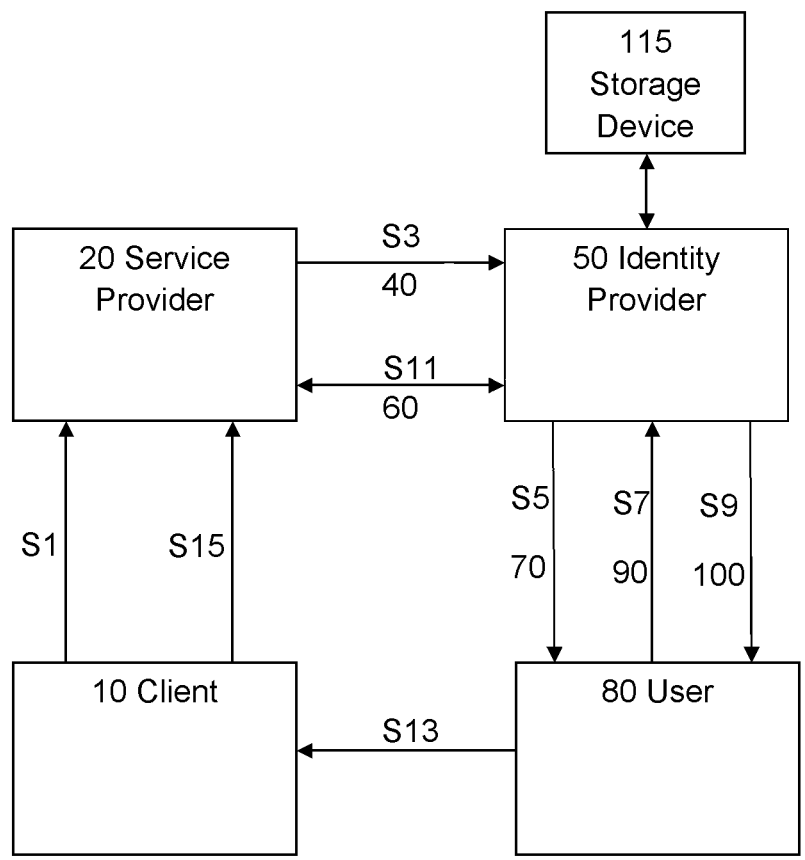
FIG. 1 shows schematically an example of an embodiment of the present invention.

Embodiments of the invention are concerned with providing a process for determining whether a service provider should trust a client of the service provider. FIG. 1 illustrates an operating environment within which exemplary embodiments may be practiced. In this environment, a client 10 of a service provider 20 may request a service from the service provider 20 on behalf of a party. The client 10 may, for example, be an application or program running on a device, and in general, the user of the device will be using the client 10 to indirectly request the service, via the client 10.

As discussed above, prior art methods and systems do not provide adequate methods for ensuring that the client 10 is authorized to request services on behalf of the party. As an example, the service provider 20 may be an online merchant, and the client 10 may request the merchant 20 to carry out a monetary transaction on behalf of a party. In this case, it is important that the service provider 20 can trust that the client 10 is authorized to request a monetary transaction on behalf of the party. In particular, in the case that the client 10 is an application running on a device, it may be that the user of the device is attempting to fraudulently use the details of the party via the client 10 in order to carry out a transaction. It is important that the service provider 20 can identify such fraudulent activity.

In one embodiment, as illustrated in FIG. 1, in order to access services provided by a service provider 20 on behalf of a party, the client 10 sends details (step S1) to the service provider 20 that unambiguously identify the party. In other words, the client 10 claims to be associated with a party that is using the client 10. These details (sent at step S1) may, for example, include details such as the name of the party, details of a bank account held by the party, a contact address for the party, or any other information that may unambiguously identify a party. In the present example, the details (sent at step S1) are sufficient for the service provider 20 to provide services to the client 10 (in the event that the service provider determines to trust that the client 10 is the party identified in the details).

Upon receipt of the details (sent at step S1) from the client 10, the service provider 20 forms an association between the client 10 and the party. At this stage, however, the service provider 20 does not trust that the association between the client 10 and the party is valid. In other words, the service provider 20 does not trust that the client 10 is authorized to request a service on behalf of the party and therefore, at this stage of the process, the association is an untrusted association. In order for the service provider 20 to verify whether the client 10 is authorized to request a service on behalf of the party, the service provider 20 sends data (step S3) containing information that unambiguously identifies the party to an identity provider 50 via a first channel 40. The identity provider 50 is an entity that knows the party that is associated with the client 10 and is trusted by the service provider 20. The identity provider 50 may, for example, be a bank with which the party holds an account.

The identity provider 50 and the service provider 20 are preconfigured with a first cryptographic protocol for configuring the first channel 40. The first cryptographic protocol is such that data sent via the first channel 40 is at least signed by the sender. Such a cryptographic protocol allows the recipient to authenticate the sender of the data, and also to guarantee that the data has not been tampered with (i.e. the recipient can guarantee the integrity of the data). The first cryptographic protocol may also be such that the sender cannot deny sending the data. The first cryptographic protocol may optionally also be such that data sent via the first channel 40 is encrypted to prevent third parties "eavesdropping" on the data. Such cryptographic protocols are well known in the art (and include, for example, the SSL/TLS protocol). As an example, the first cryptographic protocol may utilize asymmetric cryptographic keys and algorithms for signing the data and the protocol and keys may have been configured using a Public Key Infrastructure (PKI). Thus, the service provider 20 signs the data that uniquely identifies the party associated with the client 10 according to the first cryptographic protocol before sending the data to the identity provider 50 at step S3 and upon receipt the identity provider 50 uses the first cryptographic protocol to determine whether the data is authentic and to check its integrity. In the event that the data sent via the first channel 40 is determined not to be authentic, the identity provider 50 may determine not to trust that the data originated from the service provider 20 and the identity provider 50 may, in one arrangement, terminate all further action with respect to the party associated with the client 10.

The identity provider 50 and the service provider 20 are also preconfigured with a second cryptographic protocol for configuring a second channel 60. The second cryptographic protocol is also such that data sent via the second channel 60 is signed by the sender. Thus data sent via the second channel can be authenticated and checked for integrity by the recipient. The data may be signed in such a way that the sender of the data cannot deny that they sent the data and the recipient cannot deny that they received the data. Preferably the second cryptographic protocol is also such that data sent on the second channel is encrypted. This ensures the data cannot be eavesdropped by third parties.

The first cryptographic protocol may be the same as the second cryptographic protocol, in which case the first and second channels 40, 60 are equivalent and data sent via either of these channels 40, 60 is signed according to the same cryptographic protocol. In the case that the second channel is encrypted, the first channel is also encrypted. The second channel 60 will be discussed in more detail later.

In one example, the data that unambiguously identifies the party that is sent via the first channel 40 is sufficient to identify the party to the identity provider 50, but is insufficient for a transaction to be carried out using the data, or for the identity of the party to be fraudulently used in any other way. In other words, if the data sent at step S3 were to be intercepted (and decrypted, if the first cryptographic protocol is such that the data sent via the first channel 40 is encrypted in addition to being signed), it could not be used to carry out a transaction or to fraudulently use the identity of the party identified in the data.

As mentioned above, the party associated with the client 10 is already known by the identity provider 50, and the identity provider 50 therefore has a pre-existing relationship with the party. At the start of this relationship, and independently of the embodiments described herein, the identity provider 50 may have independently verified the identity of the party up to a level of trust accepted by the identity provider 50 and obtained and stored details (i.e. personally identifiable information) about that party for use in unambiguously identifying that party at a later time. Such details may include, for example, the passport number or national insurance number of the party, or as another example, such details may comprise biometric materials obtained from the party at the start of the relationship. As the identity provider 50 initially verified the identity of the party, the identity provider may then trust that the identity of any party who can provide some or all of the personally identifiable information collected by the identity provider 50 has the identity of the party associated with the client.

As a particular example, the identity provider 50 may have initially verified the identity of the party and obtained the details for later unambiguously identifying the party according to "Know Your Customer" guidelines. In this case, the identity provider 50 may have identified the level of risk that the party presents and thereby determined the level to which the identity provider 50 needs to verify the identity of the party. Depending on the level of risk that the party presents, the identity provider 50 may find a photographic ID sufficient proof of the identity of the party, or the identity provider may require the party to provide additional evidence as to their identity, such as bills or a birth certificate for example. According to these guidelines, the identity provider 50 may also maintain and update information about the party throughout the relationship and this information can also be used to identify the party at later times.

Once the identity provider 50 has received the data containing information relating to the party associated with the client 10 from the service provider 20 at step S3, the identity provider then uses this information to look-up the previously stored identity of the party from a storage device 115, for example, whereby to identify the party.

Once the identity provider 50 has identified the party associated with the client 10, the identity provider 50 identifies a predetermined medium 70 for contacting the party associated with the client 10. This predetermined medium 70 is a medium that has been established during their pre-existing relationship and may be, for example, a voice circuit (i.e. a phone call), an SMS channel (carrying, for example, a text message) or a data packet network (carrying, for example, an email).

In one example, the identity provider 50 uses the data received from the service provider 20 via the first channel 40 to derive the predetermined medium for contacting the party from a storage device 115 that is accessible by the identity provider 50, for example. The storage device 115 may store associations between the party and at least one communication medium 70 that has been previously agreed between the identity provider 50 and the party. The storage device 115 may be a component of the identity provider 50, or may be provided by any external storage means that it is accessible by the identity provider 50.

Once the identity provider 50 has identified the predetermined medium 70 for contacting the party associated with the client 10, the identity provider 50 then attempts to contact (at step S5) the party via the predetermined medium 70 and invites the user 80, contacted via the predetermined medium 70, to identify itself. The identity provider 50 may directly invite the user 80 to identify itself (for example by sending a message to the user 80 at step S5 that requests the user 80 to identify itself), or the identity provider may indirectly invite the user 80 to identify itself (for example, by sending a message at step S5 that asks the user 80 to contact the identity provider 50 and then, if the user 80 contacts the identity provider 50, requesting the user 80 to identify itself).

When the user 80 successfully identifies itself to the identity provider 50 at step S7, the identity provider 50 is configured to determine, up to a predetermined level of trust, whether the identity of the user 80 corresponds to the identity of the party associated with the client 10. The identity provider 50 may, in one example, determine to trust that the user 80 is the party associated with the client 10 if the user identifies itself at step S7 in accordance with a predetermined set of authentication criteria unique to the associated party. These criteria may require that the user 80 identifies itself at step S7 via a second predetermined communication medium 90. This second predetermined communication medium 90 may be a medium that has been pre-agreed between the identity provider 50 and the party associated with the client 10 and may be different to the first predetermined communication medium 70. This second predetermined medium 90 may be derived from data accessible to the identity provider 50 from a storage device 115 that stores associations between the party and a number of predetermined communication media 70,90. In one example, if the user 80 identifies itself at step S7 via a medium other than the second predetermined communication medium 90, the identity provider 50 determines that the identity of the user 50 does not correspond to the identity of the party associated with the client 10. The second communication medium 90 may be, for example, a voice circuit (e.g. a phone call), SMS channel (carrying, for example a text message) or a data packet network (carrying, for example, an email).

This predetermined set of authentication criteria may additionally/alternatively require that the user 80 can correctly answer certain questions, the answers to which are only known by the party associated with the client 10 and the identity provider 50. In general, these authentication criteria are, in themselves, conventional and known. The level of trust to which the identity provider 50 trusts that the identity of the user 80 corresponds to the identity of the party associated with the client 10 is dependent on how stringent this set of predetermined authentication criteria is.

If the identity provider 50 determines that the identity of the user 80 corresponds to the identity of the party associated with the client 10, the identity provider 50 sends at step S9 a first secret to the user 80 (i.e. the party associated with the client 10) via a third channel 100.

The third channel 100 may be configured according to a cryptographic protocol. The cryptographic protocol may be such that data sent via the third channel 100 is encrypted and thus, if a third party were to intercept the data sent via the third channel 100, the first secret could not be deciphered by that party and used to fraudulently cause the service provider 20 to trust the client 10.

In a first arrangement, the cryptographic protocol may have been established when the relationship between the identity provider 50 and the party associated with the client 10 was first configured, and this may have involved the exchange of cryptographic materials for example.

In a second, alternative arrangement, the identity provider 50 and the user 80 may agree upon the configuration of the third channel 100 at some point between step S7 and step S11. In this arrangement, the related cryptographic materials may be exchanged securely over a public channel using, for example, Diffie-Hellmann key exchange. However, in this case, the identity provider 50 and the party will have pre-agreed to use such a method.

The first secret shared via the third channel 100 may be, for example, a number or a password comprising numbers, letters and symbols and may, for example, be randomly generated.

In one arrangement, the identity provider 50 generates the first secret and stores an association between the first secret and the identified party. In addition, the identity provider 50 sends a second secret, which corresponds to the first secret, to the service provider 20 via the second channel 60 at step S11. As mentioned above, the second channel 60 is configured according to the second cryptographic protocol and thus the second secret is at least signed and preferably also encrypted by the identity provider 50 according to the second cryptographic protocol before sending.

Upon receipt, the service provider 20 uses the second cryptographic protocol to authenticate the second secret and check its integrity. Encrypting the second secret is preferable because it ensures that third parties cannot discover the second secret and use it fraudulently. Upon receipt of the second secret, the service provider 20 stores an association between the second secret and the party associated with the client 10. In this arrangement, the second secret may either be sent after the first secret is sent to the user 80 at step S9, or before the first secret is sent.

In an alternative arrangement, the service provider 20 may generate the second secret, and may send it (at step S11) to the identity provider 50 via the second channel 60. It will be appreciated that in this arrangement, the service provider 20 must send the second secret to the identity provider 50 before the identity provider 50 can send the first secret to the user 80 at step S9.

In either arrangement, the second secret is shared between the identity provider 50 and the service provider 20 such that both the identity provider 50 and the service provider 20 share a secret related to the party associated with the client 10, which can be used to determine whether to trust the client 10 as will be described further. In this arrangement, the service provider 20 can choose the format of the secret. This has the advantage that, if the service provider 20 can use any of a plurality of identity providers 50, then the format of the second secret (and correspondingly therefore the format of the first secret) can remain consistent, irrespective of the identity provider 50 with which the service provider 20 interacts. In either arrangement, it had been pre-agreed between the identity provider 50 and the service provider 20 who will generate the secret.

If the user 80 is the user of the client 10 then the user 80 can provide at step S13 the first secret received at step S9 to the client 10, which can then send data at step S15 containing this first secret to the service provider 20.

Upon receipt at step S15 of data from the client 10 containing a secret, the service provider 20 then compares the secret received in the data to the second secret that was shared between the identity provider 50 and the service provider 20 via the second channel 60. If the secret received in the data at step S15 corresponds to the second secret, the received secret is highly likely to have been obtained via a party that the identity provider 50 has determined is the party associated with the client 10.

Moreover, the service provider 20 knows the level of confidence (trust) to which the identity provider 50 has determined whether the user 80 is the party associated with the client 10, and has approved this level of determination. In one example, the level is pre-agreed between the service provider 20 and the identity provider 50 and in another example, the level is dynamically requested by the service provider 20 based on the type of service requested by the client 10. Therefore, if these two secrets correspond, the service provider 20 determines to trust the client 10. In particular, the service provider 20 determines to trust that the client 10 is authorized to request a service on behalf of the party. The service provider can then provide the requested services to the client 10 using the details provided by the client 10 at S1.

It will be appreciated that the present invention is not limited to the level at which the service provider 20 can determine whether to trust the association between the client 10 and the associated party, and that the service provider 20 can determine to trust the client 10 up to the same level to which the identity provider 50 determines to trust that the user 80 is the party associated with the client 10.

In the process described above, the details sent by the client 10 to the service provider 20 at step S1 are those that are required by the service provider 20 to provide a service to the client 10 (e.g. account details, name, address etc.). In an alternative example, the identity provider 50 has access to details relating to the party associated with the client 10 e.g. via the storage device 115. In this example, the identity provider 50 can use the data sent at step S3, which identifies the party associated with the client 10, to look up the details required by the service provider 20 to provide a service, and then send these details to the service provider 20. Thus in this arrangement, the client 10 need not send a large number of details to the service provider 20 at step S1, but is only required to send to the service provider 20 details that are sufficient to identify the identity of the party to the identity provider 50 at step S3. In particular, the client 10 need not send confidential details, and can instead send details that are of little or no value to an "eavesdropper". As an example, the client 10 may only be required to send the first and last digits of a credit card number, a post code and a day of birth to the service provider 20.

Advantageously the details required by the service provider 20 may be sent from the identity provider 50 to the service provider 20 via a signed and encrypted channel to prevent third parties from discovering the details or altering the details in order to obtain a service on behalf of a party other than the party associated with the client 10. For example, in the case that the first and/or second channels 40, 60 are encrypted, the details may be sent via the second channel 60.

In the above processes, the service provider 20 establishes a level of trust with the client 10 through the use of an identity provider 50 and therefore, the identity provider 50 acts as a proxy for the service provider 20. In general, the "identity provider" 50 could be any entity that is trusted by the service provider 20 and that knows (or stores/has access to information relating to) the party associated with the client 10. It will be appreciated however that before such an entity is able to act as a proxy for the service provider 20, that entity is required to negotiate the cryptographic protocols for use in configuring the first and second channels 40, 60 with the service provider 20.

As will be appreciated from the foregoing, the present invention provides several points at which fraudulent activities can be identified and prevented. First, if the identity of the party is being fraudulently used by/via the client 10, then, upon receipt of the message from the identity provider 50 via the first predetermined medium 70, the user 80 (who in most cases will be the party associated with the client 10) will be alerted to the fact that someone may be trying to fraudulently use their identity. Second, if the user 80 does not respond to the message sent at step S7, the identity provider 50 will also be alerted that the details of the party may be being used fraudulently. In either case, the identity provider 50 will not share the first secret with the user 80 at step S9, and the client 10 will be unable to provide the correct secret to the service provider 20 at step S15. Further, if the user 80 does not identify itself to the identity provider 50, the identity provider 50 may be configured to inform the service provider 20 that verification was unsuccessful. Upon receipt of such a message, the service provider 20 may determine that it cannot trust the client 10, and thus the service provider 20 may refuse to provide services to the client 10.

It may be that the first predetermined contact medium 70 between the identity provider 50 and the associated party is somehow compromised. For example, if the identity provider 50 is configured to attempt to contact the associated party at step S5 via a text message sent to a device associated with the party, the contact medium 70 may be compromised by the device having been stolen, cloned or controlled remotely via malware infection for example. In this case, if a fraudster attempts to identify themselves to the identity provider 50 at step S7, the fraudster will, most likely fail the predetermined set of authentication criteria required by the identity provider 50 and will therefore not receive the first secret at step S9. Again, upon determining that the user 80 is not the party associated with the client 10, the identity provider 50 may be configured to indicate to the service provider 20 that verification of the identity of the user 80 was unsuccessful. Upon receipt of such a message, the service provider 20 may determine not to trust the client 10 and may not provide a service to that client 10.

As mentioned above, because data sent via the first and second channels 40, 60 is signed by the sender, tampering by third parties can be easily detected. In one arrangement, if tampering is detected, the process is terminated, and the service provider 20 does not establish trust with the client 10.

Figure 2:
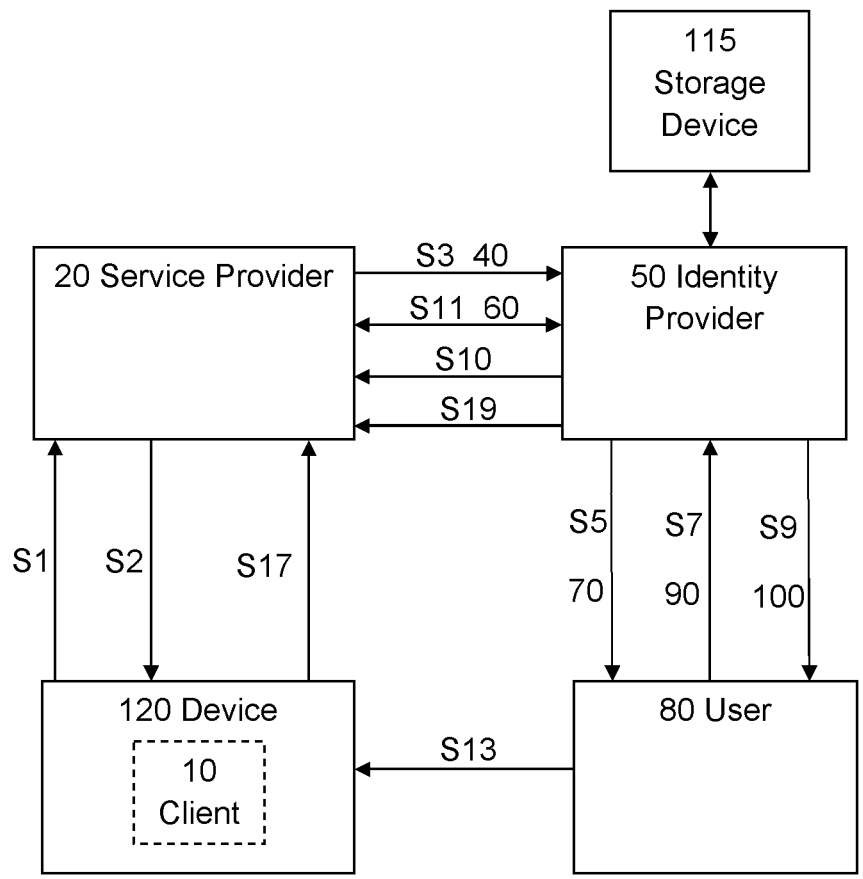
FIG. 2 shows schematically an example of an alternative embodiment of the present invention.

FIG. 2 shows an adaptation of the above embodiment as illustrated schematically in FIG. 1 (referred to hereinafter as the FIG. 1 embodiment), wherein, the client 10 is an application or program running on a device 120 and the service provider 20 can determine whether to bind the identity of the device 120 to the identity of a party associated with the client 10 in addition to determining whether to trust the client 10.

As in the FIG. 1 embodiment, the client 10, requesting access to services from the service provider 20 on behalf of a party, first sends details that identify the party at step S1 from the device 120 to the service provider 20. In this second embodiment, upon receipt of these details, the service provider 20 generates a device identifier that is unique to the device 120, and the service provider 20 stores an association between this unique device identifier and the client 10. The unique device identifier could be a code, password, cryptogram, or number and may be, for example, generated at random by the service provider 20. The service provider 20 sends this unique device identifier to the device 120 at step S2 and the device 120 stores the identifier 120 so that the client 10 (or device 120) can identify the device 120 to the service provider 20 at a later time.

In an alternative arrangement, the device 120 could generate its own unique device identifier, which it may send to the service provider 20. The service provider would again store an association between the unique device identifier and the client 10 and thus the unique device identifier could again be later used to identify the device 120 to the service provider 20. The unique device identifier may, in one example, be sent automatically by the device 120 at step S1.

As another alternative embodiment, the unique device identifier could be derived from a combination of the both aforementioned arrangements.

As a particular example, the unique device identifier may be formed from hashed values of the CPU (central processing unit) serial number of the device 120, the GPU (graphics processing unit) serial number of the device 120, and/or, if the device 120 is a mobile phone, the IMEI (international mobile equipment identity). These details may be hashed using a salt value given by the timestamp of the message sent from the client 10 to the service provider 20 at step S1. Such hashed values are of little use to fraudsters if intercepted. As another example, the unique device identifier could be made up of material stored in a secure element of the device 120. The unique device identifier could additionally or alternatively be generated in dependence on user data collected by the device 120. The device 120 could collect, for example, bio-metric or bio-mechanical parameters such as recordings of device movements, or voices and sounds, key log patterns, dynamic camera images, or images of inner ear and retina patterns.

As in the FIG. 1 embodiment, the service provider 20 needs to determine whether the client 10 is authorized to access a service on behalf of the party and thus again sends data that unambiguously identifies the party associated with the client 10 to the identity provider 50 via the first channel 40 (which, as defined above, is configured according to the first cryptographic protocol such that data sent via the first channel 40 is at least signed by the sender and is optionally also encrypted). Again, the identity provider 50 acts as a proxy for the service provider 20, and uses the data received via the first channel 40 to identify the party associated with the client 10 and thereby enable the service provider 20 to determine whether to trust the client 10 by carrying out the steps S5 to S11 as described above with reference to FIG. 1.

As in the FIG. 1 embodiment, if the party associated with the client 10 successfully receives the first secret at step S9, they can then provide this secret to the client at step S13. Unlike the FIG. 1 embodiment however, in this embodiment, upon receipt of the first secret at step S13, the client 10 sends, at step S17, data that contains not only the first secret but also the unique device identifier associated with the device 120 to the service provider 20. In one particular arrangement, the unique device identifier is automatically sent by the device 120 to the service provider 20 when the client 10 uses the device 120 to send the first secret to the service provider 20 at step S17. In an alternative arrangement, the client 10 may have access to a number of devices, and the client 10 may send the data comprising the first secret and the unique device identifier from a device other than the device 120 associated with the client 10. In this case, the unique device identifier may be entered into the device manually by the user of the device.

Upon receipt of the data from the client 10 at S17, the service provider 20 then determines whether the received secret corresponds to the second secret (sent/received at step S11 via the second channel 60) and also whether the received unique device identifier corresponds to the unique device identifier associated with the device 120. As in the FIG. 1 embodiment, in the event that the service provider 20 determines that the received secret corresponds to the second secret, the service provider 20 determines to trust the client 10 (i.e. to trust that the client 10 is authorized to access a service on behalf of the party associated with the client 10). The service provider 20, therefore, forms a trusted association between the client 10 and the party. Further to this however, in the present embodiment, if the service provider 20 also determines that the received unique device identifier corresponds to the unique device identifier associated with the device 120, the service provider 20 further determines to trust that the party associated with the client 10 is in possession of the device 120, and therefore forms a trusted association between the unique device identifier associated with the device 120 and the identity of the party (and thus, any details held by the service provider 20 relating to the associated party).

In one example, if the service provider 20 forms a trusted association between the device 120 and the party, the service provider 20 binds the identity of the device 120 to the identity of the party associated with the client 10, such that, if the device 120 is later used to gain access to services provided by the service provider 20, the service provider 20 will, in general, trust that the user of the device is the party bound to that device 120. The service provider 20 may, in this way, allow the client 10 on the device 120 to request services on behalf of the party bound to the device 120 without further authentication checks.

As an alternative, the service provider 20 may only trust that a user of the device 120 (using the client 10 to request a service from the service provider 20) is the party that is bound to the device 120 for services up to a certain value. For services above this value, the service provider 20 may be configured to confirm, using the identity provider 50 as a proxy to carry out steps S3 to S11 as described above with reference to FIG. 2, that the identity of the user of the device 120 corresponds to the identity of the party bound to the device 120. Additionally or alternatively the service provider 20 may check that the holder/user of the device 120 is the party that is bound to the device after a certain amount of time has elapsed, or after a certain number of services have been requested from device 120, or if the service provider 20 suspects that the device 120 has been compromised. A particular example, wherein the service provider 20 is configured to check whether the user of the device 120 is the party bound to the device 120, is shown schematically in FIG. 5 and will be described later in the description.

As mentioned above with reference to FIG. 1, the identity provider 50 has details relating to the party stored in a storage device 115 accessible by the identity provider 50 and the identity provider 50 may use the data sent at step S3 to look up or derive details that are required by the service provider 20 to provide a service from the storage device 115, and then sends some or all of these details to the service provider 20. If the service provider 20 is providing payment services, the identity provider 50 may send, for example, the account details of the party to the service provider 20, and any other details, such as a name and address that may be required to carry out a transaction. This step of sending details required by the service provider 20 is illustrated schematically in FIG. 2 at step S19. Advantageously the details sent at step S19 are sent via a secure channel (i.e. one in which data is both signed and encrypted by the sender). In one arrangement, upon receiving the details sent at step S19, the service provider 20 may bind the details to the device 120 so that, if a service is later requested from the device 120, the service provider 20 need not resend the details. It will be appreciated that step S19 could be carried out at any time after step S3 has been carried out (e.g. it could be carried out before step S5 or S11).

As described above in relation to FIG. 1, in the event that the identity provider 50 determines that the user 80 contacted at step S5 is not the party associated with the client 10, or if the user 80 does not identify itself at step S7, the identity provider 50 sends, at step S10, an indication to the service provider 20 that verification of the identity of the associated party was unsuccessful. Upon receipt of such an indication, the service provider 20 may stop trusting the association between the client 10 and the party associated with the client 10, and may additionally/alternatively block services to the device 120.

Figure 3:
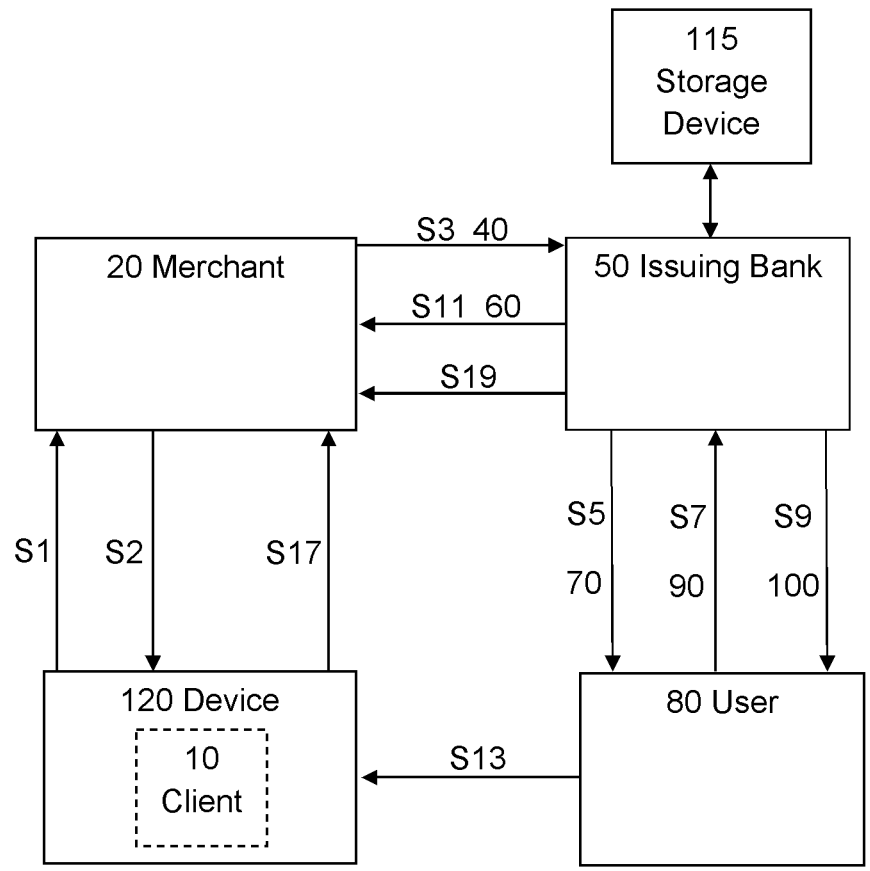
FIG. 3 shows schematically a particular example of the embodiment of FIG. 2 in which, the service provider is an online merchant and the identity provider is a bank.
Figure 4:
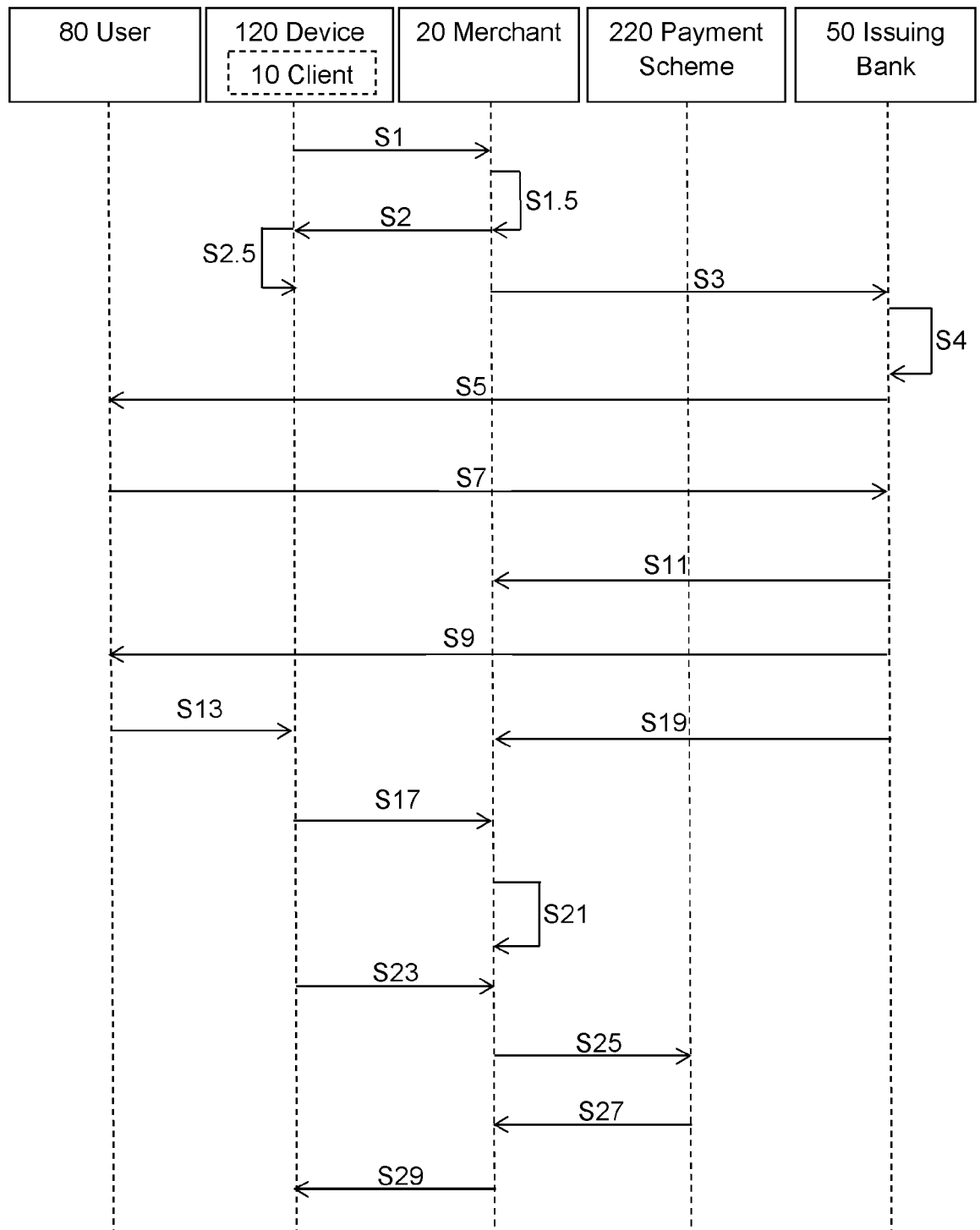
FIG. 4 shows schematically a time flow diagram of the example shown in FIG. 3.

FIG. 3 and FIG. 4 show schematically a particular example of the invention according to the FIG. 2 embodiment described above, wherein the service provider is an online merchant 20, which provides online payment services (such as mobile payment services, online wallet services or e-store services) to client applications or programs running on devices. FIG. 3 illustrates an operating environment, within which the present example may be practiced and FIG. 4 shows an exemplary timing diagram of the steps carried out by the various entities involved.

As with the more general embodiments above, in this example, the client 10 requests a service on behalf of an account holder by first sending details to the merchant 20 at step S1. Such a service may be, in this case, a transaction from the account of the account holder and such details may identify an account of the account holder. In this case, the merchant 20 forms an initial untrusted association between this account and the client 10. The client 10 is a program or an application on the device 120, and the merchant 20 is configured to determine, with the help of a proxy 50, whether to trust the client 10 and also whether to bind the device 120 to the account (or the account holder) associated with the client 10. The merchant 20 generates a unique device identifier and stores an association between this unique device identifier and the client 10 at step S1.5 (see FIG. 4). The merchant 20 then sends the unique device identifier to the device 120 at step S2, where it is stored at step S2.5 (see FIG. 4). Advantageously the unique device identifier is stored in a secure element of the device 120.

In this example, the proxy is an issuing bank 50 that knows (or stores/has access to/can derive) details relating to the account holder associated with the client 10. The issuing bank 50 may, in one example, be the bank at which the account (or account holder) associated with the client 10 is held.

To enable the issuing bank 50 to act as proxy, the merchant 20 sends data that unambiguously identifies the bank account associated with the client 10, to the issuing bank 50 via a first channel 40 at step S3. As in the embodiments of FIGS. 1 and 2, the merchant 20 and the issuing bank 50 are preconfigured with a first cryptographic protocol for configuring the first channel 40. The first cryptographic protocol is, in this example, such that data sent via the first channel 40 is both signed and encrypted by the sender. Thus at step S3, the merchant 20 first signs and encrypts the data identifying the bank account before sending it.

The issuing bank 50 uses the data received at step S3 to identify the account holder associated with the client 10 at step S4 (see FIG. 4). The issuing bank 50 then attempts to share a secret with the account holder by carrying out steps S5 to S11 as described above with reference to FIGS. 1 and 2. Various aspects of these steps, which are specific to the present example, will now be set out in the following description.

First, in the present example, the issuing bank 50 and the account holder have, at some time during their pre-existing relationship, agreed that the issuing bank 50 will contact the account holder regarding authorization of payments from the account of the account holder by sending a text message to the account holder. It has also been agreed that the account holder will authorize a payment from their account by telephoning the bank 50. Therefore, in this example, the first communication medium 70, used by the issuing bank 50 to contact the account holder and request the user 80 (who may or may not be the account holder) to identify itself at step S5, is an SMS channel, and the second communication medium 90, used by the user 80 to identify itself at step S7, is a voice circuit.

Second, it will be recalled that, once the user 80 has identified itself (at step S7), the issuing bank 50 uses a predetermined set of authentication criteria to determine whether the identity of the user 80 corresponds to the identity of the account holder associated with the client 10. In this particular example, the predetermined set of authentication criteria requires that the user 80 correctly answers a number of questions. Such questions may include questions about recent transactions made from the account of the account holder and secret questions pre-agreed between the issuing bank 50 and the account holder (such as, "what is the surname of the person who was your best friend is high school?"). Such criteria are well known. For high risk/high value transactions, more rigorous checks can be carried by the issuing bank 50 (e.g. the issuing bank 50 may require the user 80 to visit a branch of the issuing bank 50 in person bearing 3 pieces of identification).

Third, in the present example, the issuing bank 50 is configured to generate a secret unique to the account holder at the same time as it identifies the account holder associated with the client 10 at step S4. If the issuing bank 50 determines that the identity of the user 80 corresponds to the identity of the account holder, the issuing bank 50 sends a first secret to the user 80 (i.e. the account holder) at step S9 and a second secret to the merchant 20 at step S11. Again, these secrets correspond to one another.

In this example, the second secret is sent via the second channel 60, which in this example is configured according to the first cryptographic protocol. In other words, therefore, the first and second channels 40, 60 are the same and data sent via the first/second channel is both signed and encrypted according to the first cryptographic protocol. Upon receipt of the encrypted second secret at step S11, the merchant 20 decrypts and authenticates the secret according to the first cryptographic protocol.

The first secret is sent to the user 80 via a third channel 100, which has been pre-agreed between the issuing bank 50 and the account holder and which may be configured as discussed above with reference to FIG. 1. In particular the pre-agreed channel 100 may be one in which data is both signed and encrypted.

In this example, the issuing bank 50 also sends data containing details relating to the account holder to the merchant 20 at step S19. In one example, these details may be sent along with the second secret, via the second channel 60. These details are ones that would be required by the merchant 20 to make a payment service to/from the account of the account holder. Such details may include, for example, the card number and expiry date of a bank card associated with the account that was identified by the client 10 at step S1, and the name and contact details of the account holder.

It will be understood that, in general, if the issuing bank 50 generates the secret unique to the party associated with the client 10, the secret can be sent to the merchant 20, at any time after the party has been identified to the bank 50 (at step S3), but must be sent to the merchant 20 before the merchant 20 can determine whether to trust the client 10. Advantageously the secret may only be generated and shared with the merchant 20 if the issuing bank 50 determines that the identity of the user 80 corresponds to the identity of the account holder (i.e. after step S7). This would avoid secrets being generated unnecessarily if the issuing bank 50 does not verify that the identity of the user 80 corresponds to the identity of the holder of the account associated with the client 10. On the other hand, if the secret unique to the account holder is generated by the merchant 20, then the second secret must be sent to the issuing bank 50 before the issuing bank 50 can share the first secret with the user 80 at step S9.

If the user 80 (i.e. the account holder associated with the client 10) is the user of the device 120 (on which the client 10 is executed), then the first secret can be provided to the client 10 at step S13 and sent in data to the merchant 20 at step S17. As in the FIG. 2 embodiment, the data sent at step S17 also contains the unique device identifier received at step S2. The merchant 20 then uses the secret and the unique device identifier received at step S17 to determine, at step S21, whether to trust the client 10 and whether to bind the identity of the device 120 to the identity of the account holder and/or account held by the account holder, as described above in relation to FIG. 1. If the secret and the device identifier are correct, the merchant 20 also binds, at step S21, the details received at step S19 to the identity of the device 120 and thus, if the client 10 later requests a service on behalf of the associated account holder, the client 10 is required to send only the unique device identifier of the device 120 in order for the merchant 20 to identify both the account bound to the device and the relevant details necessary to provide the service to the client 10 on behalf of the account holder.

In this example, at some time later (at step S23), the client 10 sends a request to the merchant 20 to carry out a transaction. The request includes a transaction amount and also the unique device identifier of the device 120. The merchant 20 uses the unique device identifier to identify the device 120, and thus the account associated with this device 120. The merchant 20 also derives the details relating to the account and the account holder bound to the device 120 (i.e. the details initially received from the issuing bank at step S19) from the unique device identifier. The merchant 20 then sends (at step S25) data containing these details, and also the transaction amount received at step S23, to a payment scheme 220. This data is subsequently processed by the payment scheme in accordance with conventional methods, which are outside of the scope of the invention. Briefly, the payment scheme 220 coordinates authorization, clearance and settlement of the transaction, which is to say it checks the account holder has sufficient funds to cover the transaction and if the funds are sufficient, sends an indication to the merchant 20 at step S27, so that the merchant 20 can complete the service at step S29.

As mentioned above, in one example, it may be that the merchant 20 only trusts that a user of the device 120 (using the client 10 to request a transaction from the merchant 20) is the holder of the account associated with the device 120 for transactions up to a certain limit. For transactions above this limit, the merchant 20 may be configured to confirm that the identity of the user of the device 120 corresponds to the identity of the holder of the account associated with the device 120 using the techniques described above with reference to FIG. 2.

Figure 5:
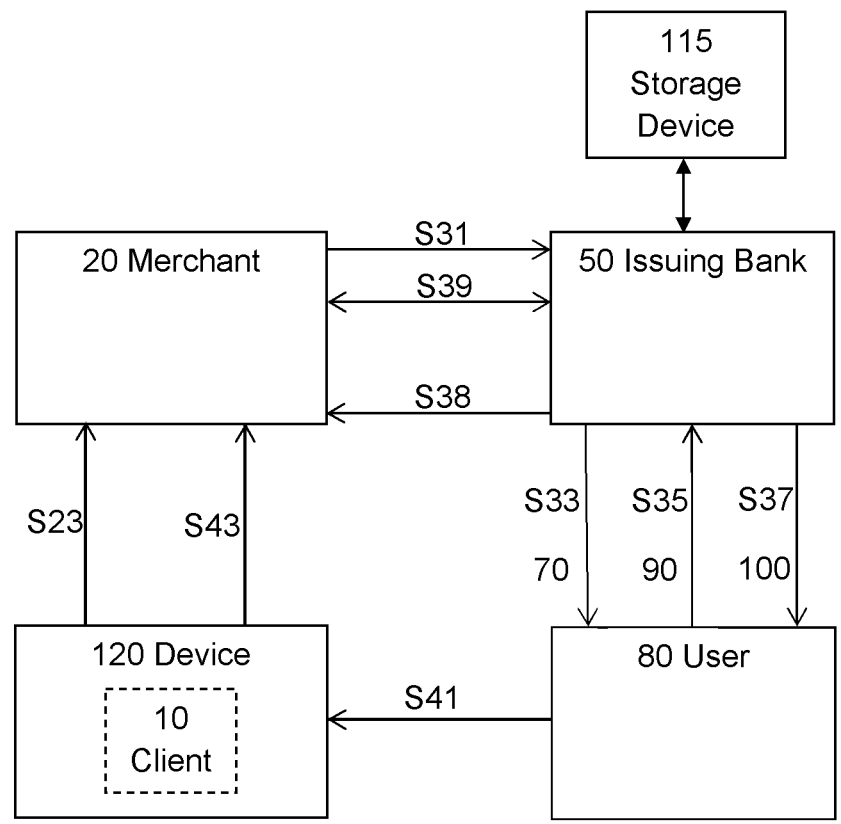
FIG. 5 shows schematically a further example of an embodiment of the present invention in which, the service provider is an online merchant and the identity provider is a bank.

FIG. 5 shows a block diagram of a particular example of one such method. In the example shown, the device 120 is already bound to an account held by an account holder associated with the client 10 running on the device 120. At the time that the device 120 was bound to the account, it was determined by the merchant 20 that the user of the device 120 was the account holder. The client 10 running on the device 120 sends a request to a merchant 20 to carry out a transaction from/to the account associated with the device 120 at step S23. The request contains the unique device identifier of the device 120 and also specifies a transaction amount. In this example, the transaction amount is above a predetermined upper limit and thus the merchant 20 is triggered to check whether the user of the device is the holder of the account bound to the device 120 (that is to say, whether the client 10 on the device 120 is still authorized to request a transaction on behalf of the holder of the account bound to the device 120). The merchant 20, therefore, uses the unique device identifier to identify the device 120 and thus the associated account that is bound to the device 120. The merchant 20 also uses this unique device identifier to look up details that relate to the account associated with the device 120 and that were stored by the merchant 20 during the registration process (i.e. the details received from the issuing bank 50 at step S19). The transaction limit could be unique to the account bound to the device 120, and in this case, the merchant 20 will only be triggered to authenticate the user of the device 120 once the merchant 20 has identified the account that is bound to the device 120 from the unique device identifier. In general, the limit may, for example, have been set by the merchant 20, the account holder or the issuing bank at which the account is held.

The merchant 20 then uses these details to send data that identifies the account associated with the device 120 to the issuing bank 50 via the first channel 40 at step S31 (equivalent to S3 in FIGS. 1 to 4), so that the issuing bank 50 can act as a proxy for the merchant 20 to enable the merchant 20 to determine whether to trust the client 10 according to any of the processes described above. More specifically, the issuing bank acts a proxy by carrying out the steps S33 to S39, which are respectively equivalent to steps S5 to S11 of FIGS. 1 to 4 and the merchant determines whether to allow the requested transaction in dependence upon data received at step S43 (equivalent to S17 in FIGS. 1 to 4) containing a secret and a unique device identifier.

In this example, if the issuing bank 50 does not trust that the identity of the user 80, contacted at step S33, is the same as the identity of the account holder bound to the device 120, then the issuing bank 50 sends an indication at step S38 (equivalent to S10 in FIGS. 1 to 4) to the merchant 20 that verification was unsuccessful. This may occur because the user 80 did not attempt to identify itself at step S35; because the user 80 denied the request for a transaction on their behalf at step S35; or because the user 80 did not meet the predetermined authentication criteria required by the issuing bank 50 at step S35. Upon receipt of this indication, the merchant 20 may unbind the device 120 from the account holder with which the device 120 was initially associated. The merchant 20 may additionally block the device 120 from further services with the merchant 20.

The particular process outlined above, i.e. the determination of whether the user of the device 120 is the holder of the account bound to the device 120, is triggered if the client 10 requests a transaction above a certain threshold; however, the method may also be triggered in accordance with other criteria. For example, the merchant 20 may check whether the user of the device 120 is the holder of the account that is bound to the device 120 after a certain amount of time has elapsed, or after a certain number of transactions have been made using the device 120, or, more generally, if the merchant 20 suspects that the device 120 may have been compromised. In another example, the issuing bank 50 may suspect fraudulent activities from the account associated with the device 120, and may, for example, notify the merchant 20 that a check of the identity of the holder of the device 120 should be carried out.

Figure 6:
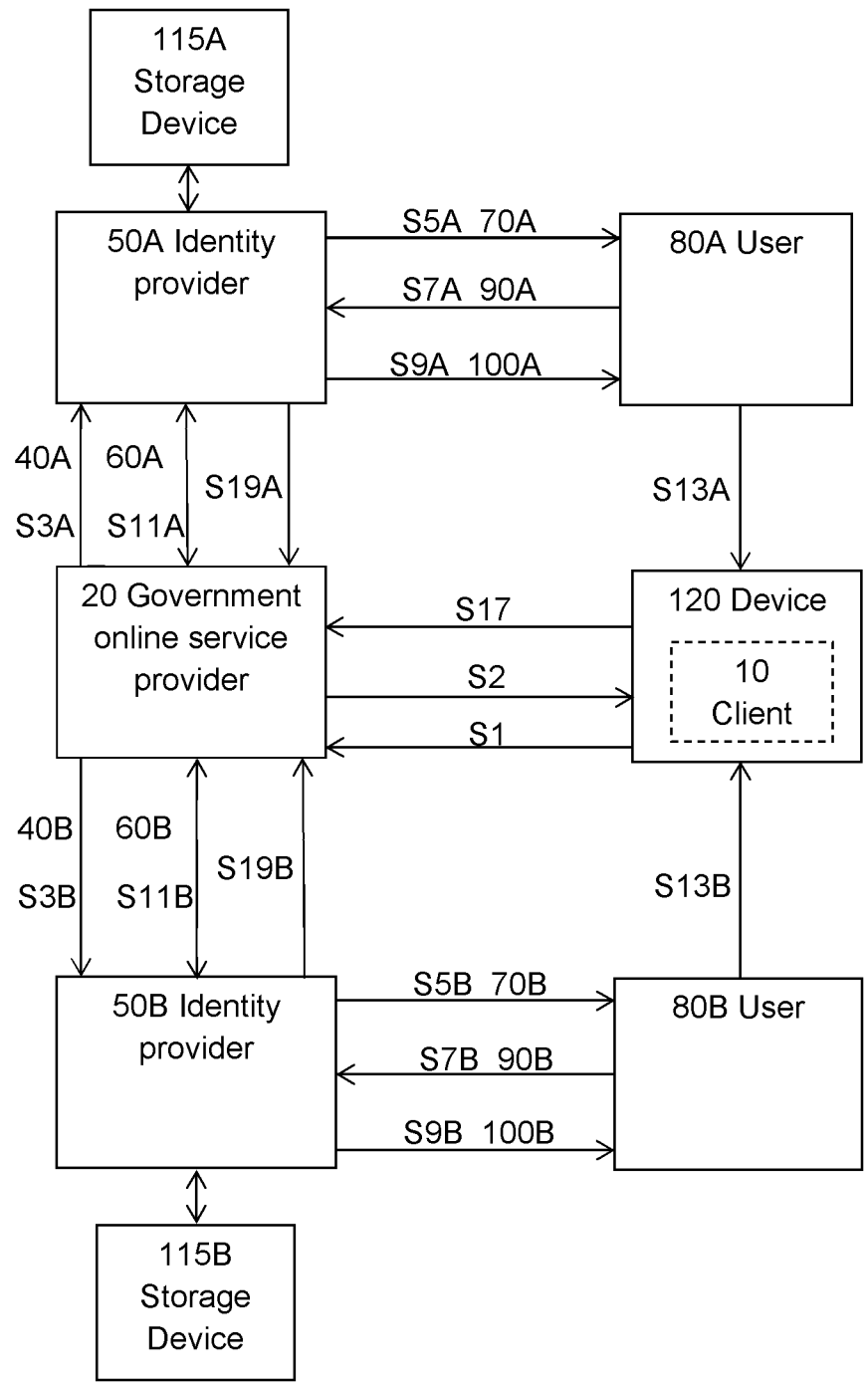
FIG. 6 shows schematically a further example of an embodiment of the present invention in which, there are two identity providers; and, FIG. 7 shows schematically components of exemplary computing devices configured to execute any of the exemplary embodiments as described herein.

FIG. 6 shows a further example of an embodiment of the present invention, wherein the service provider 20 is a government online service provider, which may provide, for example, services such as benefits payments, police enquiry services, border control services, passport services etc. As in the FIG. 2 embodiment, the client 10 is an application or a program running on a device 120 and the client 10 requests, via the device 120, a service from the government online service provider 20 on behalf of a citizen. The government online service provider 20 is configured to determine whether to trust the client 10 and also whether to bind the identity of the citizen to the identity of the device 120. The client 10 first sends (at step S1) details from the device 120 to the government online service provider 20 that unambiguously identify the citizen. As for the foregoing embodiments, the government online service provider 20 stores an untrusted association between the client 10 and the citizen, and also an association between a unique device identifier, unique to the device 120, and the client 10.

In this arrangement, the citizen is known by two identity providers 50A, 50B, which are both trusted by the government online service provider 20 and can thus act as independent proxies for the government online service provider 20 by enabling the government online service provider 20 to determine whether to trust the client 10 and resultantly, whether to bind the device 120 to the citizen. As in the forgoing examples, each of the identity providers 50A, 50B is required to negotiate respective first and second cryptographic protocols for configuring the respective first and second channels 40A, 40B, 60A, 60B (for sharing data and the second secret respectively) with the government online service provider 20 before it can act as a proxy. It will be appreciated that the first and second channels 40A, 60A, for the first identity provider 50A are distinct from the first and second channels 40B, 60B for the second identity provider 50B and may be configured according to different protocols.

In this example, the identity providers 50A, 50B may be, for example, government entities that store details relating to the citizen; health care providers with which the citizen is registered; insurance companies with which the citizen is registered; or police servers storing details relating to the citizen.

In this case, two different second secrets, which are both unique to the citizen associated with the client 10, are shared between the identity providers 50A, 50B and the government online service provider 20 via the respective second channels 60A, 60B, for the identity providers 50A, 50B at steps S3A, S3B. That is to say that each identity provider 50A, 50B signs (and preferably also encrypts) its respective second secret according to its respective second cryptographic protocol and sends it to the government online service provider 20 via its respective second channel.

Each of the identity providers 50A, 50B independently attempts to share a first secret corresponding to a different one of the second secrets for the identity providers 50A, 50B, with the citizen according to the processes outlined above (e.g. in relation to FIG. 1). Thus, in this case, the government online service provider 20 only determines to trust the client 10 if the client 10 provides data at step S17 containing two secrets that each correspond to a different one of the second secrets for the two identity providers 50A, 50B.

If the secrets correspond, and if the data sent at step S17 also contains a unique device identifier that corresponds to the unique device identifier associated with the device 120, then the government online service provider 20 further determines to bind the identity of the device 120 to the identity of the citizen associated with the client 10 as explained above.

It will be understood that in any of the examples outlined above, a service provider 20 can use a plurality of identity providers 50 to determine to trust a client 10 of the service provider 20. In this case, the service provider 20 will share a different second secret via a respective second channel 60 with each of these identity providers 50, and the service provider will determine to trust the client 10 if the client 10 sends the service provider 20 a plurality of secrets at step S17, each of which correspond to a different one of the second secrets shared between the service provider 20 and the identity providers 50. The greater the number of independent identity providers 50 used by the service provider 20, the greater the level of confidence with which the service provider 20 can trust the client 10 and thus a plurality of identity providers 50A, 50B . . . can, in general, be used when a high level of identity assurance is needed by the service provider 20.

It will also be understood by a person skilled in the art that a number of the steps outlined above can be combined or can have their order modified. For example, if the service provider 20 generates a secret that is unique to the party associated with the client 10, the service provider can send data containing both details identifying the party and the generated secret to the identity provider at the same time and via the same channel 60.

Figure 7:
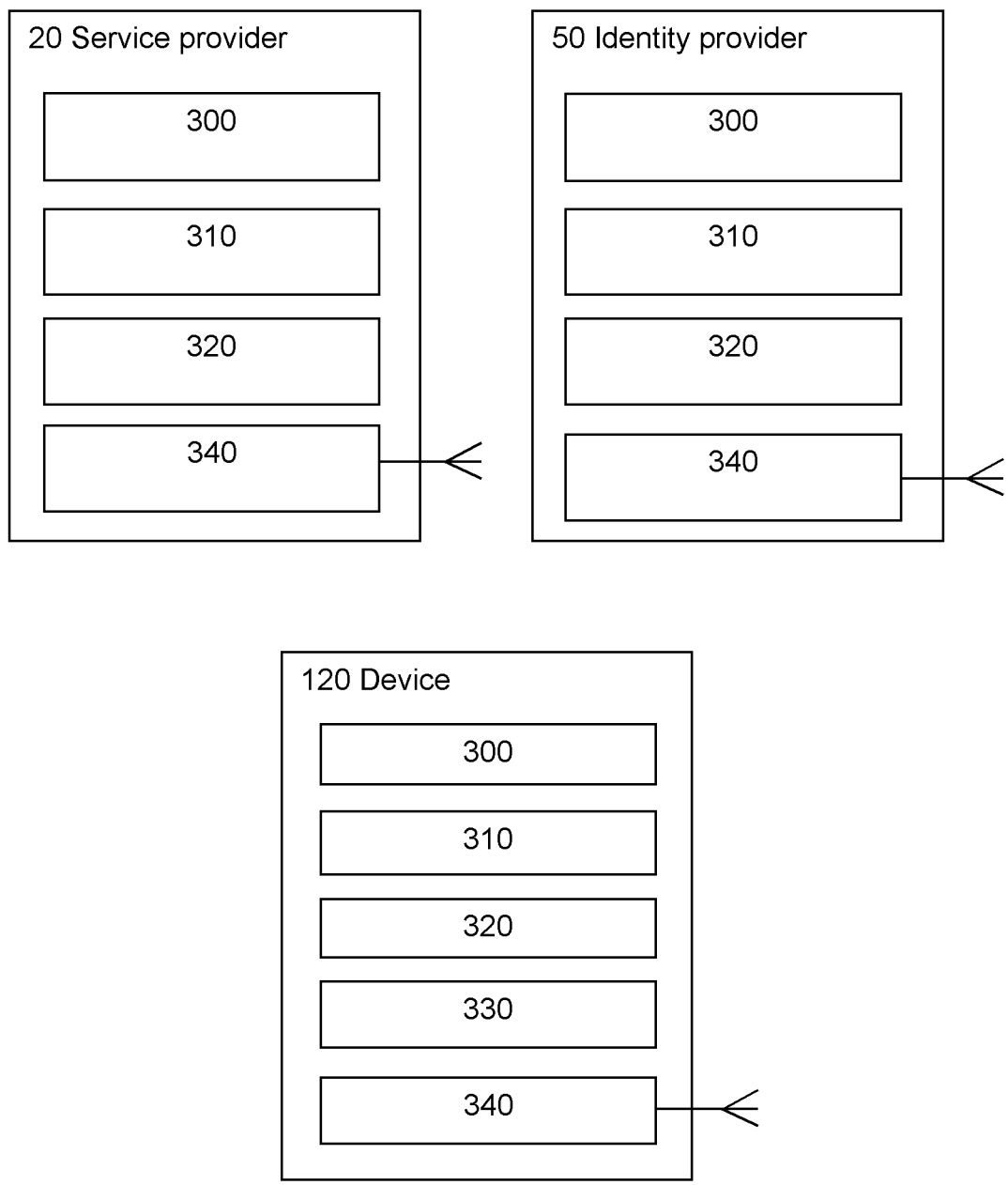

FIG. 7 shows schematically components of exemplary computing devices configured to execute any of the exemplary embodiments as described above. The device 120 is provided by a computing device comprising processor 300, a non-volatile storage device 310 (such as a hard disk drive and/or non-volatile memory such as a so-called solid state disk for example) and a random access memory (RAM) 320. The processor 300 processes instructions stored in the random access memory 320 that have been loaded from the non-volatile storage device 310. These instructions are in the form of computer software in the form of one or more applications. In particular, such applications include the client application 10. Applications running on the processor 300 also process user input obtained from a user interface 330, whether via a touch screen and/or keyboard, etc. The user interface 330 can be used by the user of the device 120 to provide details identifying a party to the client application 10 running on the device 120, and also to input the first secret at step S13. The device 120 also includes a communication interface 340 (or a plurality of such interfaces) which allows applications running on the processor 300 to transmit and receive data to and from other devices and systems via a communications network (or a plurality of such networks), or other means such as Bluetooth™ or NFC (Near Field Communication), via wired and/or wireless connections. In particular, the communication interface 340 is for use in communicating with the service provider 20. The device 120 may also optionally have a trusted execution environment (e.g. a secure element), where, for example, the unique device identifier can be encrypted, cryptographic keys can be stored and information can be signed. Such a secure element is, in one example, accessible to the client application 10.

The service provider 20 is also provided by a computing device comprising processor 300, a non-volatile storage device 310 (such as a hard disk drive and/or non-volatile memory such as a so-called solid state disk for example) and a random access memory (RAM) 320. The processor 300 processes instructions stored in the random access memory 320 that have been loaded from the non-volatile storage device 310. These instructions are in the form of computer software in the form of one or more applications. Such applications may, for example, generate a secret that is unique to the party associated with the client 10 running on the device 120 or, as another example, compare a secret received from the device (at step S15/S17) to a secret stored in the non-volatile storage device 310. The applications may also configure the first and second channels 40,60 according to the first and second cryptographic protocols. The secret received from the device 120 may be encrypted, and thus may need to be decrypted before it can be compared to the secret stored in the non-volatile storage device 310. The non-volatile storage device 310 may store data relating to the client application 10 running on the device 120 and the party associated with the client application 10 (such data may include, for example, the identity of the party a secret associated with the party and the identity of the device 120 associated with the client 10). The non-volatile storage device 310 may also store one or more cryptographic keys and one or more associated cryptographic algorithms for use in configuring the first and second channels 40,60 according to the first and second cryptographic protocols. The service provider computing device 20 also includes a communication interface 340 (or a plurality of such interfaces) which allows applications running on the processor 300 to transmit and receive data to and from other devices and systems via a communications network (or a plurality of such networks), or other means such as Bluetooth™ or NFC (Near Field Communication), via wired and/or wireless connections. In particular, the communication interface 340 is for use in communicating with the device 120 and also the identity provider 50. The service provider 20 computing device may optionally also comprise a hardware security module (HSM), which may store the above-mentioned cryptographic keys and algorithms and may be used to decrypt received data that has been encrypted and signed. The HSM may also be used to generate a secret that is unique to the party associated with the client 10 running on the device 120.

The identity provider 50 is similarly provided by a computing device comprising processor 300, a non-volatile storage device 310 (such as a hard disk drive and/or non-volatile memory such as a so-called solid state disk for example) and a random access memory (RAM) 320. The processor 300 processes instructions stored in the random access memory 320 that have been loaded from the non-volatile storage device 310. These instructions are in the form of computer software in the form of one or more applications. Such applications may, for example, determine whether the identity of an identifying party 80 corresponds to the identity of the party associated with the client 10 running on the device 120. The non-volatile storage device 310 may, for example, store data relating to the party associated with the client application 10 running on the device 120 and in particular, may store data from which, a predetermined medium 70 for contacting the party can be determined and also from which, it can be determined whether the identity of an identifying party 80 corresponds to the identity of the party associated with the client 10 running on the device 120. The non-volatile storage device 310 may also store one or more cryptographic keys and one or more associated cryptographic algorithms for use in configuring the first and second channels 40,60 according to the first and second cryptographic protocols. The identity provider computing device 50 also includes a network interface 340 (or a plurality of such interfaces) which allows applications running on the processor 300 to transmit and receive data to and from other devices and systems via a communications network (or a plurality of such networks), via wired and/or wireless connections. In particular, the communication interface 340 is for use in communicating with the service provider 20 and also possibly for contacting the party associated with the client 10 running on the device 120 at step S5. The identity provider 50 computing device may optionally also comprise a HSM, which may store the above-mentioned cryptographic keys and algorithms and may be used to encrypt, decrypt, and sign data. The HSM may also be used to generate a secret that is unique to the party associated with the client 10 running on the device 120.

In many of the examples described above, the client 10 is an application or a program running on a device. It will be understood, however, that the role of the client 10 can be filled, for example, by a person using a device and claiming to a service provider 20 to have the identity of a party. In this case, the methods outlined above can be used to determine whether the identity of the client 10 corresponds to the identity of the party, or whether the client 10 is fraudulently using the details of the party.

The above embodiments are to be understood as illustrative examples of the invention. Further embodiments of the invention are envisaged. For example, the secret that is shared between the service provider 20 and the identity provider 50 may have been generated by the service provider 20, and may have been prepositioned in a secure element of the device 120, the secure element being an element that is not automatically accessible by the client 10 running on the device 120. In this case, if the user of the device provides a secret, which has been received from the identity provider 50 at step S9, to the client 10 running on the device 120 at step S13 the client 10 can, in turn, share this secret with the device 120. The device 120 may then determine whether the secret provided by the client 10 corresponds to the secret that is stored in the secure element on the device. If the secrets correspond, the device 120 may allow the client 10 (and therefore the user of the device 120) to access services on the device 120. This may be useful, for example, if the device 120 contains secret/sensitive documents, which should only be accessed by certain people. In this case, the device 120 is, in essence, part of the service provider 20 and the service provider 20 regulates access to the secret/sensitive documents on the device. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

What is claimed is:

1. A computer-implemented method of establishing trust between a service provider and a client of the service provider through an identity provider that is trusted by the service provider, the method comprising:
    configuring a first channel between the identity provider and the service provider with a first cryptographic protocol, wherein the first channel is configured such that data received by the identity provider from the service provider via the first channel is signed by the service provider according to the first cryptographic protocol;
    determining that the data received by the identity provider via the first channel is authentic according to the first cryptographic protocol;
    identifying a medium for communications between a party and the identity provider, wherein the party is associated with the client, the party is known by the identity provider, and the data received by the identity provider from the service provider via the first channel identifies the party, and wherein the medium is predetermined by the identity provider at least in relation to determining whether the data received via the first channel is authentic;
    requesting the party to identify itself with identification data to the identity provider via the predetermined medium;
    determining, up to a predetermined level of trust, that the identification data provided by the party corresponds to stored identification data of the party held by the identity provider; and
    sharing a first secret with the party via a further channel, wherein the first secret is used by the client in establishing trust between the client and the service provider.

2. The method of claim 1, wherein in the event that the identity provider verifies that the identity of the identifying party does not correspond to an identity held by the identity provider for the party, then the identity provider indicates to the service provider that verification was unsuccessful.

3. The method of claim 1, wherein the identity provider and the service provider are configured with a second cryptographic protocol for use in configuring a second channel and the method further comprises sharing, via said second channel, a second secret between the identity provider and the service provider for the party, said second channel being configured such that data sent via the second channel is signed by one of the identity provider and the service provider sending the second secret according said second cryptographic protocol.

4. The method of claim 3, wherein upon receipt of said second secret by a corresponding other one of the identity provider and the service provider, the method includes determining whether said second secret is authentic according to the second cryptographic protocol.

5. The method of claim 3, wherein the first cryptographic protocol is the same as the second cryptographic protocol.

6. The method of claim 3, wherein the party is known by a plurality of identity providers, each of which is trusted by the service provider and is preconfigured with respective first and second cryptographic protocols for configuring respective first and second channels and in which, in the event that each said identity provider independently determines that the identification data provided by the party corresponds to the stored identification data of the party held by the identity providers, each of said identity providers shares a different first secret with the party via a respective further channel, each said different first secret being for use by the client in establishing trust between the client and the service provider.

7. The method of claim 6, wherein trust is established between the client and the service provider in dependence upon the first secret for each identity provider corresponding to the second secret for that identity provider.

8. The method of claim 6, wherein at least one identity provider sends data relating to the party to the service provider, said data being required by the service provider to provide a service to the client and being signed by the identity provider according to the respective first or second cryptographic protocol for that identity provider.

9. The method of claim 8, wherein, for each identity provider, the further channel for sharing said first secret is configured such that data sent via the further channel is signed and encrypted by the identity provider according to a cryptographic protocol pre-agreed with the party.

10. The method of claim 1, wherein said data that identifies the party is sufficient for the party to be identified by the identity provider, but is insufficient for a transaction to be carried out using the data.

11. The method of claim 1, wherein the step of determining whether the identification data provided by the party corresponds to the stored identification data held by the identity provider is dependent upon the identifying party identifying itself in accordance with a predetermined set of authentication criteria.

12. The method of claim 1, wherein, in the event that the identity provider does not determine that said received data that identifies a party that is known by the identity provider is authentic, the identity provider determines not to trust that said data was sent by the service provider.

13. A computer-implemented. method of establishing trust between a service provider and a client of the service provider through an identity provider that is trusted by the service provider, the method comprising:
 signing data that identifies a party associated with the client to the identity provider according to a first cryptographic protocol, wherein the service provider and the identity provider are preconfigured with the first cryptographic protocol and a second cryptographic protocol for use in configuring respective first and second channels between the service provider and the identity provider;
 configuring the first channel between the identity provider and the service provider with the first cryptographic protocol;
 sending the signed data to the identity provider via the first channel;
 sharing a shared secret with the identity provider via the second channel, wherein the second channel is configured such that data sent via the second channel is signed by one of the identity provider and the service provider sending the shared secret according to the second cryptographic protocol;
 determining, in response to receipt of a client secret from the client, that the client secret corresponds to the shared secret; and,
 determining to trust the client.

14. The method of claim 13, wherein upon receipt of the shared secret by one of the identity provider and the service provider, the method comprises verifying that said shared secret is signed by a corresponding other one of the identity provider and the service provider according to the second cryptographic protocol.

15. The method of claim 13, wherein the first cryptographic protocol is the same as the second cryptographic protocol.

16. The method of claim 13, wherein said association between the client and the party is dependent upon the service provider receiving data from the client that unambiguously identifies the party, said data being sufficient for the party to be identified, but insufficient for a service to be carried out using the data.

17. The method of claim 13, wherein the party is known by a plurality of identity providers, each of which is trusted by the service provider and is preconfigured with respective first and second cryptographic protocols for configuring respective first and second channels and in which each of said identity providers shares a different shared secret with the service provider via a respective second channel, each said different shared secret being for use by the service provider in establishing trust between the client and the service provider.

18. The method of claim 17, wherein the service provider receives data relating to the party from at least one identity provider, said data being required by the service provider to provide a service to the client and being signed by the at least one identity provider according to the respective first or second cryptographic protocol for that identity provider.

19. The method of claim 13, wherein said client is further associated with a device and, in the event that a secret that corresponds to said shared secret is received from the client in association with data that unambiguously identifies a said device, the method further comprises:
 determining that the device identified by said data corresponds to said associated device; and,
 binding the identity of the device to the identity of said party.

20. The method of claim 19, wherein, in the event that a message is received from the identity provider indicating that the identity provider is unable to verify the identity of the party, access to further services by said device is denied.

21. A system for use in establishing trust between a service provider and a client of the service provider through a proxy that is trusted by the service provider, the system comprising:
 a data store comprising executable software; and
 at least one processor in data communication with the data store, the processor configured to execute the software and cause a computing device to:
  configure a first channel between the proxy and the service provider with a first cryptographic protocol, wherein the first channel is configured such that data received by the proxy from the service provider via the first channel is signed by the service provider according to the first cryptographic protocol;
  determine that the data received by the proxy via the first channel is authentic according to the first cryptographic protocol
  identify a medium for communications between a party and the proxy wherein the party is associated with the client, the party is known by the identity proxy, and the data received by the proxy from the service provider via the first channel identifies the party, and wherein the medium is predetermined by the proxy at least in relation to determining whether the data received via the first channel is authentic;
  request the party to identify itself with identification data to the proxy via the predetermined medium;
  determine, up to a predetermined level of trust, that the identification data provided by the party corresponds to stored identification data of the party held by the proxy; and
  share a first secret with the party via a further channel wherein the first secret is used by the client in establishing trust between the client and the service provider.

22. A system according to claim 21, wherein the system comprises a plurality of computing devices, each of which is associated with a proxy acting for the service provider, and being preconfigured with a respective first cryptographic protocol for use in configuring respective first channels, said party being known to at least one said proxy, and each said proxy being trusted by the service provider, wherein each of the plurality of computing devices is arranged such that, in the event that each computing device independently determines that the identification data provided by the party corresponds to the stored identification data held by the proxy of the party, each of the computing devices is arranged to share a different first secret with the party via a respective further channel, each said different first secret being for use by the client in establishing trust between the client and the service provider.

23. A system according to claim 21, wherein the computing device is arranged to determine whether the identification data provided by the party corresponds to stored identification data of the party held by the proxy in dependence upon the identifying party identifying itself in accordance with a predetermined set of authentication criteria.

24. A system according to claim 21, wherein said association between the client and the party is dependent on data received by the service provider that unambiguously identifies the party, said data being sufficient for the party to be identified, but being insufficient for a service to be carried out using the data.

25. A system according to claim 24, wherein the proxy is arranged to send data relating to the party to the service provider, said data being required by the service provider to provide a service to the client and being signed by the proxy according to the first cryptographic protocol.

26. A system according to claim 21, wherein the further channel for sharing said first secret is configured such that data sent via the further channel is signed and encrypted by the proxy computing system according to a cryptographic protocol pre-agreed with the party.

27. A system according to claim 21, wherein, in the event that the proxy does not determine that said received data that identifies a party that is known by the proxy is authentic, the proxy is configured not to trust that said data was sent by the service provider.

28. A non-transitory computer-readable storage medium comprising a set of computer executable instructions stored thereon, which, when executed by a processor, cause a computing device to perform a method of establishing trust between a service provider and a client of the service provider through an identity provider that is trusted by the service provider, the method comprising:

configuring a first channel between the identity provider and the service provider with a first cryptographic protocol, wherein the first channel is configured such that data received by the identity provider from the service provider via the first channel is signed by the service provider according to the first cryptographic protocol;

determining that the data received by the identity provider via the first channel is authentic according to the first cryptographic protocol;

identifying a medium for communications between a party and the identity provider, wherein the party is associated with the client, the party is known by the identity provider, and the data received b the identity provider from the service provider via the first channel identifies the party and wherein the medium is predetermined by the identity provider at least in relation to determining whether the data received via the first channel is authentic;

requesting the party to identify itself with identification data to the identity provider via the predetermined medium;

determining, up to a predetermined level of trust, that the identification data provided by the party corresponds to stored identification data of the party held by the identity provider; and sharing a first secret with the party via a further channel, wherein the first secret is used by the client in establishing trust between the client and the service provider.

29. A non-transitory computer-readable storage medium comprising a set of computer executable instructions stored thereon, which, when executed by a processor, cause a computing device to perform a method of establishing trust between a service provider and a client of the service provider through an identity provider that is trusted by the service provider, the method comprising:

signing data that identifies a party associated with the client to the identity provider according to a first cryptographic protocol, wherein the service provider and the identity provider are preconfigured with the first cryptographic protocol and a second cryptographic protocol for use in configuring respective first and second channels between the service provider and the identity provider;

configuring the first channel between the identity provider and the service provider with the first cryptographic protocol;

sending the signed data to the identity provider via the first channel;

sharing a shared secret with the identity provider via the second channel, wherein the second channel is configured such that data sent via the second channel is signed by one of the identity provider and the service provider sending the shared secret according to the second cryptographic protocol;

determining, in response to receipt of a client secret from the client, that the client secret corresponds to the shared secret; and, determining to trust the client.

* * * * *